(12) United States Patent
Jennings et al.

(10) Patent No.: US 7,606,283 B2
(45) Date of Patent: Oct. 20, 2009

(54) LASER

(75) Inventors: Martyn Robert Jennings, Bradley Stoke (GB); Lee Douglas Miller, Portishead (GB)

(73) Assignee: MBDA UK Limited, Hertfordshire (GB)

( * ) Notice: Subject to any disclaimer, the term of this patent is extended or adjusted under 35 U.S.C. 154(b) by 18 days.

(21) Appl. No.: 11/995,926

(22) PCT Filed: Jul. 27, 2006

(86) PCT No.: PCT/GB2006/050225

§ 371 (c)(1),
(2), (4) Date: Jan. 16, 2008

(87) PCT Pub. No.: WO2007/012902

PCT Pub. Date: Feb. 1, 2007

(65) Prior Publication Data

US 2008/0212638 A1 Sep. 4, 2008

(30) Foreign Application Priority Data

Jul. 27, 2005 (GB) ................. 0515431.5

(51) Int. Cl.
*H01S 3/091* (2006.01)
(52) U.S. Cl. .............. 372/70; 372/72; 372/38.06
(58) Field of Classification Search ............ 372/70, 372/72
See application file for complete search history.

(56) References Cited

U.S. PATENT DOCUMENTS 5,193,096 A * 3/1993 Amano ............... 372/13
5,926,494 A * 7/1999 Pepper ............... 372/70
6,038,240 A 3/2000 Deutsch et al.
2006/0114961 A1* 6/2006 Manni ............... 372/70

FOREIGN PATENT DOCUMENTS

DE 38 06 797 A1 11/1989

(Continued)

OTHER PUBLICATIONS

International Search Report.
British Search Report.

(Continued)

*Primary Examiner*—Dung T Nguyen
(74) *Attorney, Agent, or Firm*—Buchanan Ingersoll & Rooney PC

(57) ABSTRACT

A laser device and a method of pumping a laser gain medium (R) comprise directing pulses of laser light from a pump laser (10) to a series of separate locations (11, 12, 13, 14, 15, 16 and 17) arranged longitudinally along the gain medium (R) in the direction of laser propagation. Each pulse of laser light generates a population inversion in an associated portion of the gain medium (R) just ahead of the laser photons. The pulses from the pump laser (10) are transmitted by a splitter (18) to the series of separate locations by optical delay lines (11, 12, 13, 14, 15, 16 and 17) and each delay line is arranged to pump a different portion of the gain medium to cause a localised population inversion. The pulse transmission delays deliver a sequence of pulses to the portions of the gain medium (R) such that each portion will in turn contribute to amplification of a laser propagating within the gain medium (R).

36 Claims, 3 Drawing Sheets

FOREIGN PATENT DOCUMENTS

| | | |
|---|---|---|
| GB | 1 579 761 | 5/1977 |
| GB | 2 384 126 A | 7/2003 |

OTHER PUBLICATIONS

Golla, D., et al., "62-W cw $TEM_{00}$ Nd:YAG laser side-pumped by fiber coupled diode lasers," *Optics Letters*, Feb. 1, 1996, pp. 210-212, vol. 21, No. 3, Optical Society of America, USA.

Notification Concerning Transmittal of Int'l Preliminary Report on Patentability (Form PCT/IB/326)/International Preliminary Report on Patentability (Form PCT/IB/373)/Written Opinion of the International Searching Authority (Form PCT/ISA/237), mailed in corresponding Int'l Patent Application No. PCT/GB2006/050225, Feb. 7, 2008; IB of WIPO, Geneva, CH/ISA-EPO, Munich, DE.

* cited by examiner

LASER

This invention concerns lasers and, more particularly, a laser device having improved pumping of its gain medium, and also a method of improving the pumping of a laser gain medium.

There is a very wide range of laser gain mediums, for instance, crystals doped with rare earth ions, glasses doped with laser-active ions, semiconductors, liquid solutions of certain dyes, and gases. This invention is not concerned with liquid or gaseous gain mediums, but is concerned with solid gain mediums including crystals, glasses and semiconductors which are individually and jointly referred to hereinafter as a "gain medium".

A gain medium is a material having atoms or molecules that can be excited to an upper lasing level to generate a population inversion that will amplify light by stimulated emission at a rate which is proportional to the number of atoms at the upper lasing level and the radiation density of the light.

The atoms or molecules of a gain medium are excited to the upper lasing level by a process, known in the art as "pumping", which inserts energy into the gain medium in a way that will promote the laser interaction. Pumping is typically achieved with sufficiently energetic pump sources to be able to act on the whole laser medium simultaneously, whether by flooding the whole laser cavity with optical radiation or by some other means. This has the disadvantage of being relatively inefficient, in that large amounts of pump energy can be wasted as heat. The technique also requires gain mediums to have relatively long lifetimes for the upper laser transition state, so that the gain medium can maintain the necessary population inversion during the interval between absorbing some pump energy and the occurrence of stimulated photon emission.

A range of optical pump sources are commonly used to provide energy to a laser system, examples being electrical discharges, flash lamps, arc lamps, light from another laser, chemical reactions and explosive devices. Such optical pump sources typically direct light towards a gain medium rod either as a continuous wave or as a series of pulses, the frequency of the pumping light being greater than that of the resulting laser light (that is the pump wavelength being shorter than that of the resulting laser light), because the energy required to pump to the upper lasing level is essentially greater than the energy released during the laser transition. This invention is concerned with optical pumping using a laser pump source.

There are hundreds of different materials that can be used as gain media to produce lasers having a wide range of frequencies with varying degrees of efficiency. Such materials typically have three or four energy levels, although some have many more energy levels with complex excitation and relaxation processes occurring between these levels. However, optical amplification takes place at a characteristic frequency computed as the energy difference between the excited state and a ground state divided by Planck's constant.

A material is usually selected for use as a gain medium because it has a relatively long lifetime for its upper transition state and is capable of producing a required frequency. Such materials have a fast radiationless transition from the pump level to the upper lasing level, followed by a much slower transition from the upper lasing level to the next energy level to achieve the necessary population inversion. This radiationless transition releases waste energy as heat.

According to one aspect of the invention a laser device has a series of optical delay lines arranged to transmit pulses from a pump laser to a series of separate locations arranged along a solid gain medium in the direction of laser propagation in the gain medium, each optical delay line being arranged to pump a different portion of the gain medium to cause a localised population inversion, and the pulse transmission delays provided by the optical delay lines are selected to deliver a sequence of pulses to the portions of the gain medium such that each portion will in turn contribute to amplification of a laser propagating within the gain medium, wherein the upper state lifetime of the gain medium is less than the light crossing time of the gain medium. In this manner the laser can be pumped in a more efficient manner as the pump energy can be delivered exactly where it is required and at the instants in time at which it is required during the passage of laser photons along the length of the gain medium. The consequence is that pump sources of much lower energy can be used, as well as the use of new laser types with materials for the gain medium that were previously considered to have an upper laser transition state lifetime that was too short. Such laser gain materials would typically have an upper laser transition state lifetime of one nanosecond or less.

The optical delay lines may be arranged to transmit pulses from the pump laser in the manner taught in our GB Patent 2384126, thereby providing many pulses of electromagnetic radiation to sequential points along the length of the gain medium with the timing of the pulses chosen to coincide with the propagation of laser photons. The pump pulse duration is typically of the order of the upper state lifetime of the gain medium and each pump pulse being inserted into the gain medium just ahead of the advancing photons, so that they are continuously directed into a region of undepleted population inversion and consequently undergo a laser interaction that efficiently experiences gain.

The pulse transmission delays may be selected to cause each pulse to be applied to that portion of the gain medium that is immediately ahead of the laser pulse. Alternatively the timing of the sequence of pulses may be selected to cause population inversion in each portion of the gain medium before the immediately preceding portion has completely discharged to the ground state of the medium.

The separate locations may be spaced at regular intervals along the gain medium or may be non-uniformly spaced along the gain medium.

Each optical delay line is preferably defined by an optical fibre.

Preferably the pulse delay between adjacent locations is substantially equivalent to the spacing of the adjacent locations divided by the speed of light in the gain medium.

Preferably the pump laser is arranged to transmit the pulses of laser light to the optical delay lines through a distribution node.

The pump laser is preferably a multiple pulse generator such as that disclosed in our GB Patent 2384126.

The laser device may have such a high gain along the length of the gain medium that it is super-radiant, and thereby is operable to generate a laser pulse from a single sequence of pulses from the pump laser. Alternatively, the gain medium may be located in a resonant cavity provided with end mirrors whereby the laser pulse will be reflected between the end mirrors to make multiple passes through the gain medium. In this case a cavity dumping mechanism may be located in the cavity and a trigger is arranged to operate the cavity dumping mechanism to release the laser pulse from the cavity. Due to the short upper state lifetime of the gain medium, by the time a laser pulse returns to a given location after reflection off a cavity mirror, most of the atoms at that location are no longer excited. It is the new pump energy that has re-excited the atoms prior to arrival of the laser pulse that allows the pulse to gain further energy.

An additional optical delay line may be arranged to actuate the source at an appropriate time during the sequence whereby the source will transmit a further pulse of laser light to the optical delay lines.

The optical delay lines may be split into a first group which is arranged to deliver pulses of laser light to promote amplification of the laser pulse in one direction, and a second group which is arranged to deliver pulses of laser light to promote propagation of the laser pulse in the opposite direction. Each group of optical delay lines may be supplied with laser light from at least one different source. Both groups of optical delay lines may be supplied with laser light from a single source, and a further optical delay line is positioned between the first and second groups of delay lines to provide the necessary delay time between the two groups of optical delay lines.

The series of optical delay lines may be split into at least one further series such that each optical delay line in the further series will deliver its pulse to a location that is laterally displaced from the locations associated with the other series of optical delay lines. In this case the gain medium may be of polygonal cross-section and separate series of the optical delay lines are positioned to transmit their pulses to series of separate locations along respective faces of the gain medium. Alternatively the gain medium may be of cylindrical cross-section and separate series of the optical delay lines are positioned to transmit their pulses to circumferentially spaced series of separate locations extending along the gain medium.

The gain medium may be defined by at least two types of gain medium arranged end-to-end. In this event each type of gain medium may be arranged to receive pulses of laser light from respective series of optical delay lines.

According to another aspect of the invention, a method of pumping a laser gain medium comprises directing pulses of laser light sequentially to a series of separate locations arranged longitudinally along the gain medium in the direction of laser propagation, whereby each pulse will generate a population inversion in an associated portion of the gain medium just ahead of the laser photons.

According to a further aspect of the invention, a method of pumping a laser gain medium comprises directing pulses of laser light sequentially to a series of separate locations arranged longitudinally along the gain medium in the direction of laser propagation, using each pulse to pump a different portion of the gain medium to cause a localised population inversion, and timing the sequence of pulses to pump the gain medium.

Either method may additionally comprise directing the pulses sequentially to further series of locations which are laterally displaced from the other series of locations.

Either method may additionally comprise deriving the pulses by directing a single source of laser light through optical delay lines of differing delays arranged in parallel. In this event the method additionally comprises using a further optical delay line to operate a cavity dumping mechanism. The method may also additionally comprise using another optical delay line to trigger the source at an appropriate time during the sequence.

From a further aspect, the invention resides in a laser device in which a series of optical delay lines are arranged to transmit pulses from a pump laser to a series of separate locations arranged along a solid gain medium in the direction of laser propagation in the gain medium, each optical delay line being arranged to pump a different portion of the gain medium to cause a localised population inversion, and the pulse transmission delays provided by the optical delay lines are selected to deliver a sequence of pulses to the portions of the gain medium such that each portion will in turn contribute to amplification of a laser propagating within the gain medium, in which the gain medium is located in a resonant cavity provided with end mirrors whereby the laser pulse will be reflected between the end mirrors to make multiple passes through the gain medium.

The invention also resides in a laser device in which a series of optical delay lines are arranged to transmit pulses from a pump laser to a series of separate locations arranged along a solid gain medium in the direction of laser propagation in the gain medium, each optical delay line being arranged to pump a different portion of the gain medium to cause a localised population inversion, and the pulse transmission delays provided by the optical delay lines are selected to deliver a sequence of pulses to the portions of the gain medium such that each portion will in turn contribute to amplification of a laser propagating within the gain medium, in which the series of optical delay lines split into at least one further series such that each optical delay line in the further series will deliver its pulse to a location that is laterally displaced from the locations associated with the other series of optical delay lines.

In a final aspect, the invention resides in a laser device in which a series of optical delay lines are arranged to transmit pulses from a pump laser to a series of separate locations arranged along a solid gain medium in the direction of laser propagation in the gain medium, each optical delay line being arranged to pump a different portion of the gain medium to cause a localised population inversion, and the pulse transmission delays provided by the optical delay lines are selected to deliver a sequence of pulses to the portions of the gain medium such that each portion will in turn contribute to amplification of a laser propagating within the gain medium, in which the gain medium is defined by at least two types of gain medium arranged end-to-end.

The invention will now be described, by way of example only, with reference to the accompanying drawings in which:—

Figure 1:
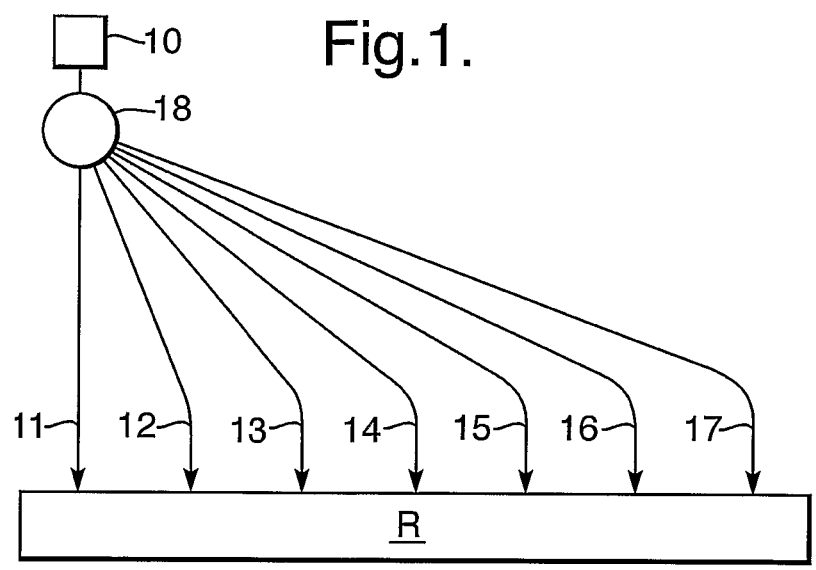
FIG. 1 is a diagram of a super-radiant laser device.

With reference to FIG. 1, a solid gain medium rod R is pumped by a pump laser 10 through optical fibres 11, 12, 13, 14, 15, 16 and 17. The output of the pump laser 10 is directed through a splitter 18 which delivers pulses of laser light to the optical fibres 11, 12, 13, 14, 15, 16 and 17 generally as taught in our patent GB 2384126. The rod R can be formed of any suitable gain medium material, for instance Nd:TAG.

The splitter 18 therefore acts as a distribution node guiding the output of the pump laser 10 into the optical fibres 11, 12, 13, 14, 15, 16 and 17 which are of different lengths and serve as a series of optical delay lines transmitting their respective laser pulses to a series of separate locations arranged along the gain medium rod R in the direction of laser propagation. In this manner, each of the optical fibres 11, 12, 13, 14, 15, 16 and 17 pumps a different portion of the gain medium rod R to cause a localised population inversion. The respective lengths of the optical fibres are chosen to produce differential delays in the transmission of the output of the pump laser 10 to the gain medium rod R.

The pulse transmission delays are dictated by the different lengths of the optical fibres, and these lengths are selected to cause each pulse to be applied to that portion of the rod R that is immediately ahead of the laser pulse. The timing of the sequence of pulses is selected to cause population inversion in each portion of the rod R before the immediately preceding portion has completely discharged to the ground state of the gain medium material forming the rod R. The pulse delay between adjacent locations is substantially equivalent to the spacing of the adjacent locations divided by the speed of light in the gain medium. Accordingly a sequence of laser pulses will be applied to the portions of the gain medium rod R so that each portion of the rod R will in turn contribute to the amplification of a laser propagating within the gain medium rod R.

As the gain medium R is formed from a material having such a high gain that it is super-radiant, it is operable to generate a laser pulse from a single sequence of pulses which, as described above, are generated by a single laser pulse from the pump laser 10. However, if desired, the pump laser 10 may itself generate a series of laser pulses, each of which is split in a corresponding sequence of pulses.

From FIG. 1 it will be noted that the separate locations at which the optical fibres 11, 12, 13, 14, 15, 16 and 17 apply their respective pulses to the rod R are spaced at regular intervals. However, it is the spatial distribution of the pulses that can be chosen to be non-uniform with more of the optical fibres delivering their laser pulses to regions of the rod where a greater concentration of pump radiation is required. If desired, several pulse lasers may be used to pump the rod R through respective sets of optical fibres.

Figure 2:
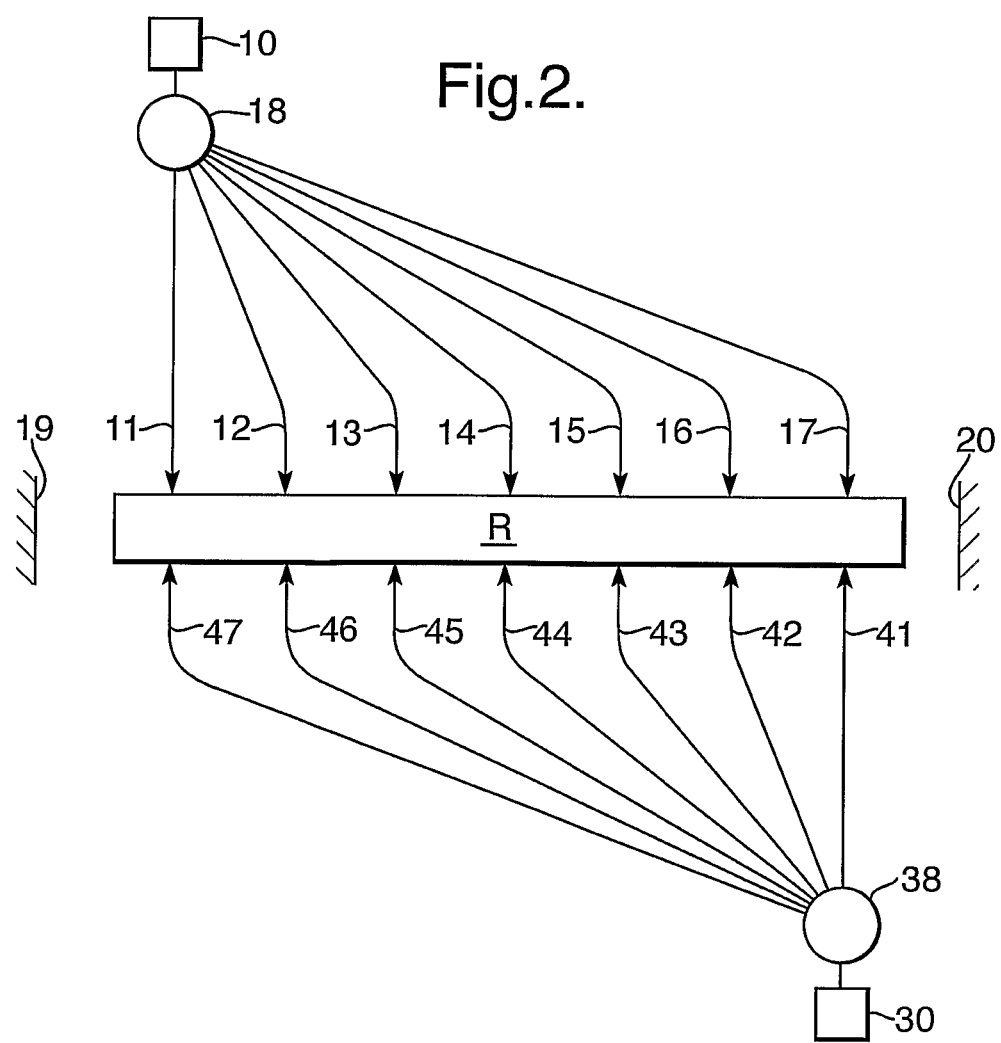
FIG. 2 is a diagram of a laser device having a resonant cavity.

The features of FIG. 1 can be applied to a non super-radiant laser device such as that illustrated in FIG. 2, in which the same reference numerals have been used to denote equivalent features. In FIG. 2 the gain medium rod R is located in an unshown cavity (in well-known manner), between end mirrors 19 and 20 for reflecting the produced laser to make multiple passes through the gain medium forming the rod R. The pump laser 10 serves to pump the produced laser towards the mirror 20 which then reflects the produced laser back into the rod R. A second pump laser 30, discharging through a second splitter 38 and optical fibres 41, 42, 43, 44, 45, 46 and 47, then drives the produced laser towards the mirror 19 thereby increasing its amplification. The pump lasers 10 and 30 of course need to be co-ordinated—this may be achieved by providing them with respective triggers actuated by additional optic fibres. In this manner, the pump lasers 10 and 30 will cause the produced laser to make multiple passes through the rod R until such time as the laser is released by using an unshown cavity dumping mechanism of any convenient kind known in the art, for instance a Q-switch or a Fabry-Perrot Etalon. Such cavity dumping mechanism may be actuated by an unshown trigger, for instance an additional optical fibre extending from the first splitter 18, to ensure co-ordination.

From FIG. 2 it will be noted that the optical fibres are split into a first group, 11, 12, 13, 14, 15, 16 and 17 which is arranged to deliver laser pulses from the pump laser 10 to promote amplification of the produced laser in one direction, and a second group 41, 42, 43, 44, 45, 46 and 47 which is arranged to deliver laser pulses from the pump laser 30 to promote amplification of the produced laser in the opposite direction. If desired, all of the optical fibres may be supplied with laser light from a single pump laser, a further optical delay line being positioned between the first and second groups of delay lines to provide the necessary time delay.

Figure 3:
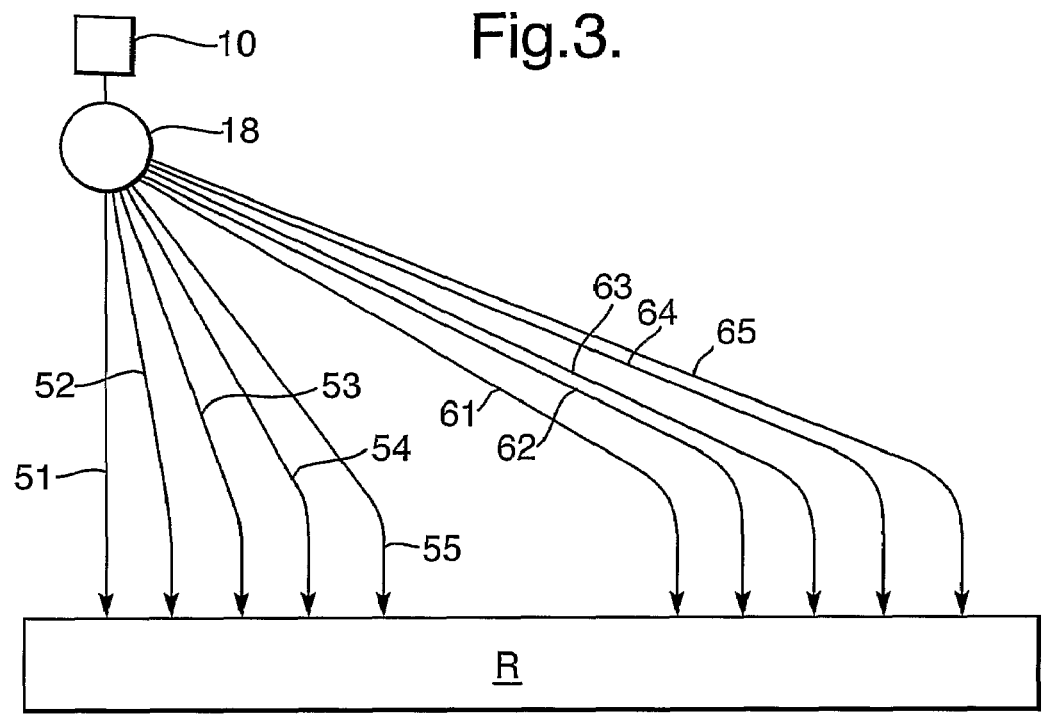
FIG. 3 is a diagram showing a first modification of the laser device shown in FIG. 1.

FIG. 3 illustrates a modification of the laser device described with reference to FIG. 1 and the same reference numerals are used to denote equivalent features. The primary difference is that the optical fibres are arranged as a first group 51, 52, 53, 54 and 55 which is laterally displaced from a second group 61, 62, 63, 64 and 65.

Figure 4:
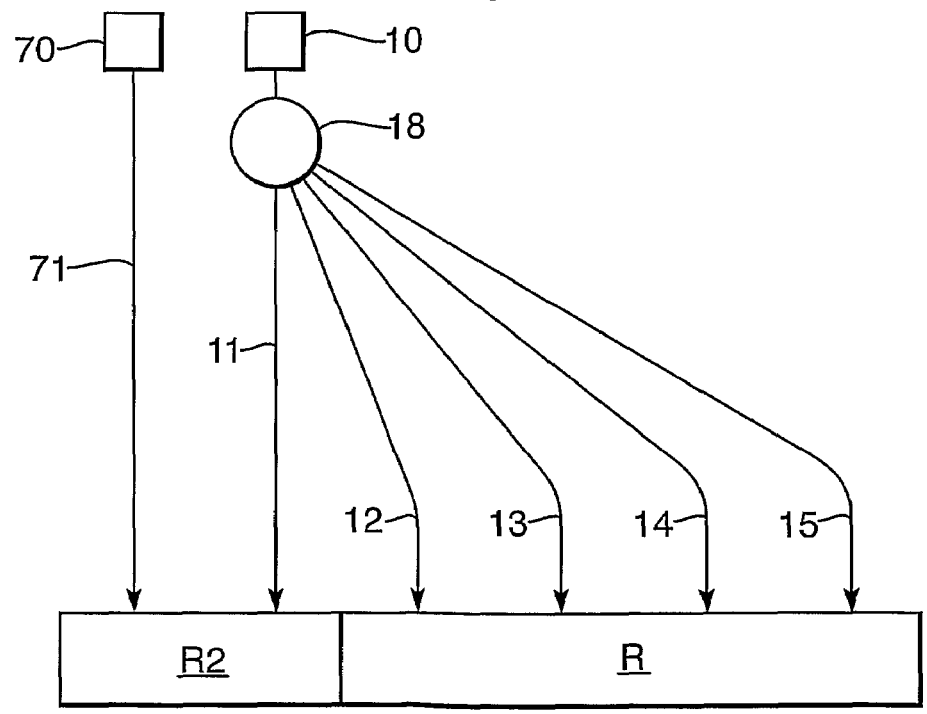
FIG. 4 is a diagram showing a second modification of the laser device shown in FIG. 1.

FIG. 4 shows a further modification of the laser device described with reference to FIG. 1, the same reference numerals being used to denote equivalent features. The primary modification is that a second gain medium rod R2 is arranged in series with the rod R and is pumped by a further pump laser 70 through an optical fibre 71 and is also pumped by the pump laser 10 through the optical fibre 11. In this manner the second rod R2 is pumped to produce a laser which passes through the first rod R in co-ordination with the pumping of the first rod R through the optical fibres 12, 13, 14, and 15. In this manner the laser device is able to produce a laser having a dual wavelength output with different polarisation states. If desired, the second rod R2 can be pumped by the pump laser 70 through additional fibres in the same way as the first rod R is pumped. Also the optical fibre 11 may be arranged to pump the first rod R instead. It is of course important for each rod R and R2 to be pumped in a manner and at a time appropriate to the laser device. For example one of the rods R or R2 may comprise a material that acts as a gate, or as an amplifier, requiring CW or quasi CW pumping, the other rod R2 or R comprising a gain medium requiring precision pulsed pumping.

The various optical fibres may be arranged so that their positioning and respective time delays will control the mode of the produced laser and the internal shape of the laser beam within the rod or rods.

The intensity of pumping can be increased further by delivering the pump pulses simultaneously from several different directions at each of the separate locations.

Figure 5:
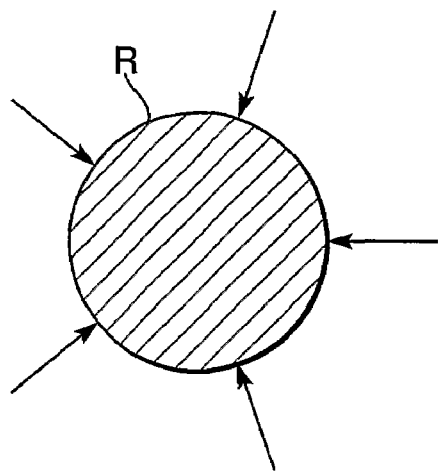
FIG. 5 is a cross-section through a cylindrical gain medium rod.

For instance, in FIG. 5, a location along the cylindrical cross-section rod R is pumped by five optical fibres equi-spaced around its periphery, as indicated by the arrows. To achieve this there would be five identical arrays of optical fibres so that each location would be simultaneously pumped by five laser pulses at the same time.

Figure 6:
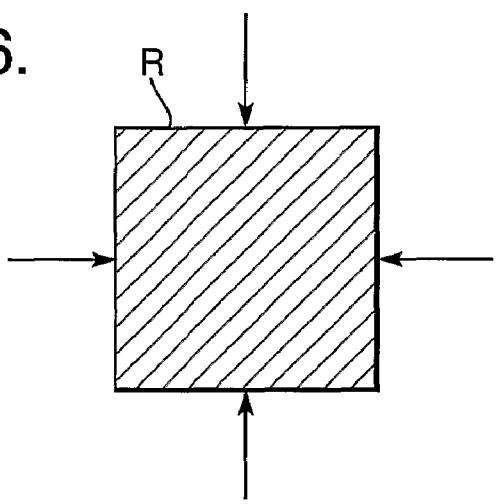
FIG. 6 is a cross-section through a polygonal gain medium rod.

FIG. 6 shows a rod R of polygonal (in this example four-sided) cross-section having each location pumped from four optical fibres each directing a laser pulse into one side of the rod as indicated by the arrows. This is achieved by providing four identical arrays of optical fibres.

Figure 7:
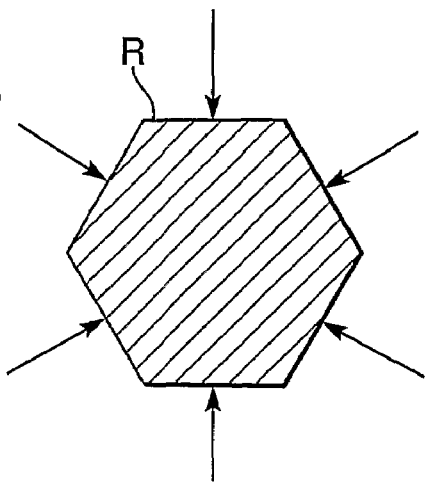
FIG. 7 is a cross-section through a hexagonal gain medium rod.

FIG. 7 shows the application of this feature to a rod R of hexagonal cross-section having each location pumped from six optical fibres each directing a laser pulse into one face of the rod as indicated by the arrows.

It will be noted that this invention enables pump energy to be delivered to discrete locations in a sequential manner by using many optical fibres with the fibre lengths and material properties determining the instant at which pump energy arrives in the gain medium. In this manner pump energy is conserved whilst at the same time increasing the pumping and reducing the energy wasted as heat.

It sill also be noted that by carefully selecting the locations and timing of the laser pulses it is possible to select or inhibit certain cavity oscillation modes. This feature may be used as the basis of a high-order rejection filter, or a mode blocking scheme, where all the cavity modes are forced to be in phase.

The invention claimed is:

1. A laser device in which a series of optical delay lines are arranged to transmit pulses from a pump laser to a series of separate locations arranged along a solid gain medium in the direction of laser propagation in the gain medium, each optical delay line being arranged to pump a different portion of the gain medium to cause a localised population inversion, and the pulse transmission delays provided by the optical delay lines are selected to deliver a sequence of pulses to the portions of the gain medium such that each portion will in turn contribute to amplification of a laser propagating within the gain medium, wherein the upper state lifetime of the gain medium is less than the light crossing time of the gain medium.

2. A laser device according to claim 1 wherein the pump pulse duration is of the order of the upper state lifetime of the gain medium.

3. A laser device, according to claims 1, in which the pulse transmission delays are selected to cause each pulse to be applied to that portion of the gain medium that is immediately ahead of the laser pulse.

4. A laser device, according to claim 1, in which the timing of the sequence of pulses is selected to cause population inversion in each portion of the gain medium before the immediately preceding portion has completely discharged to the ground state of the medium.

5. A laser device, according to claim 1, in which the separate locations are non-uniformly spaced along the gain medium.

6. A laser device, according to claim 1, in which the pulse delay between adjacent locations is substantially equivalent to the spacing of the adjacent locations divided by the speed of light in the gain medium.

7. A laser device, according to claim 1, in which the pump laser is arranged to transmit the pulses of laser light to the optical delay lines through a distribution node.

8. A laser device, according to claim 1, in which the pump laser is a multiple pulse generator.

9. A laser device, according to claim 1, which has such a high gain along the length of the gain medium that it is super-radiant, and thereby is operable to generate a laser pulse from a single sequence of pulses from the pump laser.

10. A laser device, according to claim 1, in which the gain medium is located in a resonant cavity provided with end mirrors whereby the laser pulse will be reflected between the end mirrors to make multiple passes through the gain medium.

11. A laser device, according to claim 10, in which a cavity dumping mechanism is located in the cavity and a trigger is arranged to operate the cavity dumping mechanism to release the laser pulse from the cavity.

12. A laser device, according to claim 10, in which an additional optical delay line is arranged to actuate the pump laser at an appropriate time during the sequence whereby the pump laser will transmit a further pulse of laser light to the optical delay lines.

13. A laser device, according to any of claims 10, in which the optical delay lines are split into a first group which is arranged to deliver pulses of laser light to promote amplification of the laser pulse in one direction, and a second group which is arranged to deliver pulses of laser light to promote propagation of the laser pulse in the opposite direction.

14. A laser device, according to claim 13, in which each group of optical delay lines is supplied with laser light from at least one different source.

15. A laser device, according to claim 13, in which both groups of optical delay lines are supplied with laser light from a single source, and a further optical delay line is positioned between the first and second groups of delay lines to provide the necessary delay time between the two groups of optical delay lines.

16. A laser device, according to claim 1, in which the series of optical delay lines split into at least one further series such that each optical delay line in the further series will deliver its pulse to a location that is laterally displaced from the locations associated with the other series of optical delay lines.

17. A laser device, according to claim 16, in which the gain medium is of polygonal cross-section and separate series of the optical delay lines are positioned to transmit their pulses to series of separate locations along respective faces of the gain medium.

18. A laser device, according to claim 16, in which the gain medium is of cylindrical cross-section and separate series of the optical delay lines are positioned to transmit their pulses to circumferentially spaced series of separate locations extending along the gain medium.

19. A laser device, according to claim 1, in which the gain medium is defined by at least two types of gain medium arranged end-to-end.

20. A laser device, according to claim 19, in which each type of gain medium is arranged to receive pulses of laser light from respective series of optical delay lines.

21. A method of pumping a laser gain medium comprising directing pulses of laser light sequentially to a series of separate locations arranged longitudinally along the gain medium in the direction of laser propagation, using each pulse to pump a different portion of the gain medium to cause a localised population inversion, and timing the sequence of pulses to pump the gain medium, wherein the upper state lifetime of the gain medium is less than the light crossing time of the gain medium.

22. A method, as in claim 21, additionally comprising directing the pulses sequentially to further series of locations which are laterally displaced from the other series of locations.

23. A method, as in claim 21, additionally comprising deriving the pulses by directing a single source of laser light through optical delay lines of differing delays arranged in parallel.

24. A method, as in claim 23, additionally comprising using a further optical delay line to operate a cavity dumping mechanism.

25. A method, as in claim 23, additionally comprising using another optical delay line to trigger the source at an appropriate time during the sequence.

26. A laser device in which a series of optical delay lines are arranged to transmit pulses from a pump laser to a series of separate locations arranged along a solid gain medium in the direction of laser propagation in the gain medium, each optical delay line being arranged to pump a different portion of the gain medium to cause a localised population inversion, and the pulse transmission delays provided by the optical delay lines are selected to deliver a sequence of pulses to the portions of the gain medium such that each portion will in turn contribute to amplification of a laser propagating within the gain medium, in which the gain medium is located in a resonant cavity provided with end mirrors whereby the laser pulse will be reflected between the end mirrors to make multiple passes through the gain medium.

27. A laser device, according to claim 26, in which a cavity dumping mechanism is located in the cavity and a trigger is arranged to operate the cavity dumping mechanism to release the laser pulse from the cavity.

28. A laser device, according to claim 26, in which an additional optical delay line is arranged to actuate the pump laser at an appropriate time during the sequence whereby the pump laser will transmit a further pulse of laser light to the optical delay lines.

29. A laser device, according to claim 26, in which the optical delay lines are split into a first group which is arranged to deliver pulses of laser light to promote amplification of the laser pulse in one direction, and a second group which is arranged to deliver pulses of laser light to promote propagation of the laser pulse in the opposite direction.

30. A laser device, according to claim 29, in which each group of optical delay lines is supplied with laser light from at least one different source.

31. A laser device, according to claim 29, in which both groups of optical delay lines are supplied with laser light from a single source, and a further optical delay line is positioned between the first and second groups of delay lines to provide the necessary delay time between the two groups of optical delay lines.

32. A laser device in which a series of optical delay lines are arranged to transmit pulses from a pump laser to a series of separate locations arranged along a solid gain medium in the direction of laser propagation in the gain medium, each optical delay line being arranged to pump a different portion of the gain medium to cause a localised population inversion, and the pulse transmission delays provided by the optical delay lines are selected to deliver a sequence of pulses to the portions of the gain medium such that each portion will in turn contribute to amplification of a laser propagating within the gain medium, in which the series of optical delay lines split into at least one further series such that each optical delay line in the further series will deliver its pulse to a location that is laterally displaced from the locations associated with the other series of optical delay lines.

33. A laser device, according to claim 32, in which the gain medium is of polygonal cross-section and separate series of the optical delay lines are positioned to transmit their pulses to series of separate locations along respective faces of the gain medium.

34. A laser device, according to claim 33, in which the gain medium is of cylindrical cross-section and separate series of the optical delay lines are positioned to transmit their pulses to circumferentially spaced series of separate locations extending along the gain medium.

35. A laser device in which a series of optical delay lines are arranged to transmit pulses from a pump laser to a series of separate locations arranged along a solid gain medium in the direction of laser propagation in the gain medium, each optical delay line being arranged to pump a different portion of the gain medium to cause a localised population inversion, and the pulse transmission delays provided by the optical delay lines are selected to deliver a sequence of pulses to the portions of the gain medium such that each portion will in turn contribute to amplification of a laser propagating within the gain medium, in which the gain medium is defined by at least two types of gain medium arranged end-to-end.

36. A laser device, according to claim 35, in which each type of gain medium is arranged to receive pulses of laser light from respective series of optical delay lines.

* * * * *